H. A. AMELUNG.
SEPARATING FATTY MATTER FROM ANIMAL SUBSTANCES.
No. 37,482. Patented Jan. 27, 1863.
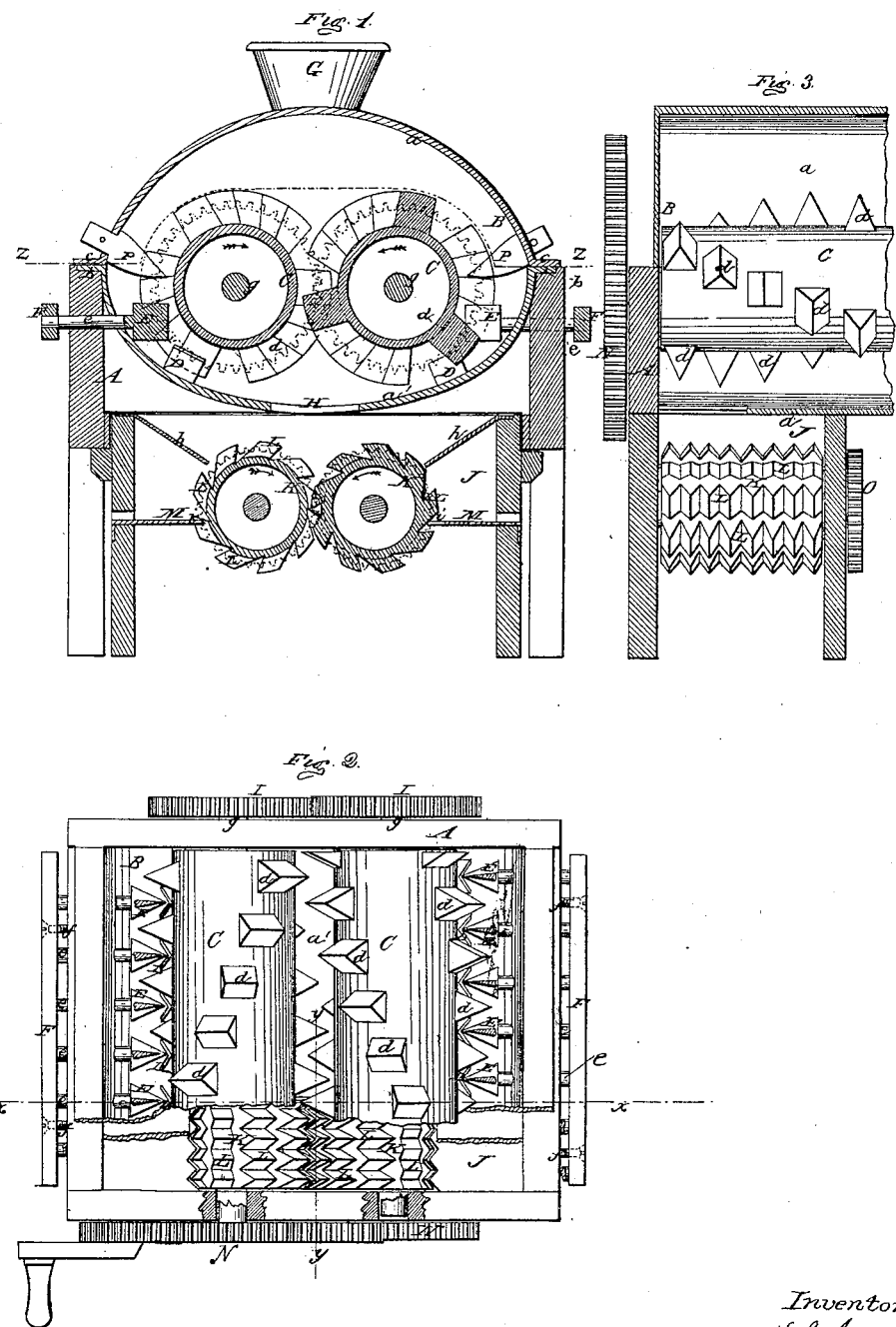

UNITED STATES PATENT OFFICE.

H. A. AMELUNG, OF CHICAGO, ILLINOIS.

IMPROVEMENT IN SEPARATING FATTY MATTERS FROM ANIMAL SUBSTANCES.

Specification forming part of Letters Patent No. 37,482, dated January 27, 1863.

*To all whom it may concern:*

Be it known that I, H. A. AMELUNG, of Chicago, in the county of Cook and State of Illinois, have invented a new and improved machine for crushing and pulverizing animal substances containing fatty matter, with a view of separating the latter from the other substances with it; and I do hereby declare that the following is a full, clear, and exact description of the same, reference being had to the accompanying drawings, making a part of this specification, in which—

Figure 1 is a side sectional view of my invention, taken in the line $x\,x$, Fig. 2; Fig. 2, a horizontal section of the same, taken in the line $z\,z$, Fig. 1; Fig. 3, a vertical section of a portion of the same, taken in the line $y\,y$, Fig. 2.

Similar letters of reference indicate corresponding parts in the several figures.

The object of this invention is to obtain a machine by which animal substances containing fatty matter may be crushed and pulverized and the fatty matter separated from the other substances in much less time and with less labor and loss of material than by the old process.

To enable those skilled in the art to fully understand and construct my invention, I will proceed to describe it.

A represents a rectangular box, in which an ellipsoidal case, B, is permanently secured. This case B is formed of cast-iron and in two sections, $a\,a'$, the lower section, $a'$, being provided at its ends with horizontal flanges $b$, which rest on the ends of the box A, and upon which flanges $b$ flanges $c$, at the ends of the upper section $a$, rest, the flanges $b\,c$ of the two sections being secured together and to the box by proper bolts. Within this case B there are placed two cast-iron cylinders, C C, which are hollow, and have teeth $d$ attached to their peripheries. These teeth are of V form, as shown in Figs. 2 and 3, and they are placed on the cylinders C C in spiral rows, the rows of one cylinder being in a reverse position to those of the other, as shown clearly in Fig. 2. The teeth $d$ do not come in contact with the cylinders. Those of one cylinder work within about a quarter of an inch of the periphery of the cylinder which is opposite to them, the teeth of one cylinder being in line with the centers of the spaces between the teeth of the other one, as also shown in Fig. 2.

D D represent two rows of stationary teeth, which are on the inner surface of the lower section, $a'$, of the case B. These rows of teeth are parallel with the axes of the cylinders C C, and are placed one below each cylinder at points, as shown clearly in Fig. 1. The teeth D are of the same form as the teeth $d$ of the cylinders, and about of the same dimensions, and they are so placed as to be in line with the centers of the spaces between the teeth $d$, and the teeth D may be solid or cast hollow, as shown in Fig. 2, and their external surfaces may be about one-quarter of an inch of the peripheries of the cylinders C C, and the external surfaces of the teeth $d$.

E E represent two rows of what may be termed "clearers," which are also of V form, and are provided each with a shank, $e$. These shanks pass through the upper part of the lower section, $a'$, of the case B, near each end of it, and are attached at their outer ends to bars F F, which are secured by set-screws $f$ to the outer sides of the box A. The clearers E are placed in line with the centers of the spaces between the teeth $d$ of the cylinders, and they may be adjusted farther in or out by regulating the set-screws $f$, as will be fully understood by referring to Fig. 2.

G is a hopper, which is placed on the upper part of the upper section, $a$, of the case B, and over the center of the space between the cylinders C C at one end of them; and H is an opening, which is made in the lower section, $a'$, of the case B, underneath the cylinders, at the end opposite to that over which the hopper G is placed. This opening H is shown in Figs. 1 and 3. The shafts $g\,g$ of the cylinders C C are connected at one end by gears I I. Underneath the box A there is a smaller box, J, in which two cylinders, K K, are placed. These cylinders are placed directly underneath the opening H, and they are of cast-iron and hollow, and provided at their peripheries with teeth L, which are in rows, having a parallel position with the axes of the cylinders, as shown in Fig. 1, and they are of V form, as shown in Figs. 2 and 3. The box J is provided with two inclined planes, $h\,h$, which serve to direct the substance operated upon to the cylinders K K, or to prevent it from passing down at the outer side of said cylinders, and there are two serrated horizontal plates, M M, secured in the box J, which serve as clearers, performing the same function as the clearers E in the upper box, A. The plates M are serrated, so as to form V shaped teeth i, to fit in the spaces between the teeth L of the cylinders K K. The cylinders K are rotated from the cylinders C by means of gearing N N, and the cylinders K are connected at one end by gears O. In the lower part of the upper section, a, of the case B, at each end, there are placed a row of knives or cutters, P, which project inward in an inclined position between the teeth d, as shown in Fig. 1.

The operation is as follows: The animal substance to be operated upon is cut into pieces of proper size and placed in the hopper C. The cylinders C C K K rotate in the direction indicated by the arrows, and the substance is drawn down between the cylinders C C and cut and crushed by the action of the same, assisted of course by the teeth d and cutters P, the cylinders crushing the bones and hard substances, and the teeth and knives cutting or reducing the flesh or softer portions. The heat of the cylinders, produced by the admission of steam within them, causes a ready separation of the fatty matter from the other portions or parts of the substance in consequence of the comminution of the latter. The stationary teeth D D serve as stops or bearings, and prevent the substance from being carried around by the cylinders as they rotate, and they also aid greatly in the cutting or reducing operation. The substance passes from the cylinders C C, through the opening H, down between the cylinders K K, where it is subjected to a similar operation. By this arrangement the animal substance is reduced to a pulpy state, and the fiber, skin, &c., disintegrated or separated from the pure fatty matter by a slight action of heat, and the fatty matter can at once be drawn off and dried, cooked, or "rendered" by any process the manufacturer may prefer, and with a less degree of heat and in about one-quarter less time than it can be accomplished by the usual process, and without losing any of the fat, as is the case when the whole mass is cooked.

This invention is more especially designed for separating the fatty matter from offal, preparatory to the compressing of the latter into cakes, which are used for the feeding of swine, poultry, and also as a fertilizer. At present the offal is simply cooked in order to deprive it of the grease, and then compressed, and the most powerful hydraulic presses fail to express all the grease from it. This invention, it is believed, will prove a great acquisition in pork-packing and other establishments where meat is cured and prepared for local use and for shipment, and in which the offal and grease is preserved separately and solid, these latter-named articles in large establishments being a great item.

I do not confine myself to the precise arrangement of means as herein shown and described for crushing or comminuting the animal substance, nor do I confine myself to the precise means herein described for the separation of the fatty matter by a gentle heat; but,

Having thus described my invention, what I do claim as new, and desire to secure by Letters Patent, is—

The separating of fatty matter from animal substances by subjecting the same to a gentle heat during the crushing, grinding, or comminuting of the same, in the manner substantially as herein set forth.

H. A. AMELUNG.

Witnesses:
WM. COCHRANE,
W. H. RICE.